(12) United States Patent
Clemen et al.

(10) Patent No.: US 8,220,276 B2
(45) Date of Patent: Jul. 17, 2012

(54) GAS-TURBINE COMPRESSOR WITH BLEED-AIR TAPPING

(75) Inventors: Carsten Clemen, Mittenwaide (DE); Henner Schrapp, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 694 days.

(21) Appl. No.: 12/382,571

(22) Filed: Mar. 18, 2009

(65) Prior Publication Data
US 2009/0301102 A1 Dec. 10, 2009

(30) Foreign Application Priority Data
Mar. 19, 2008 (DE) .......... 10 2008 014 957

(51) Int. Cl.
*F02C 6/04* (2006.01)
(52) U.S. Cl. .......... 60/785; 60/782; 415/144; 415/145
(58) Field of Classification Search .......... 60/782, 60/785; 415/144, 145
See application file for complete search history.

(56) References Cited

U.S. PATENT DOCUMENTS

| | | | |
|---|---|---|---|
| 4,008,977 A | | 2/1977 | Brown et al. |
| 4,479,755 A | * | 10/1984 | Skoe .......... 415/1 |
| 4,546,605 A | * | 10/1985 | Mortimer et al. .......... 60/226.1 |
| 4,844,689 A | * | 7/1989 | Seed .......... 415/169.1 |
| 4,882,902 A | * | 11/1989 | Reigel et al. .......... 60/806 |
| 5,059,093 A | * | 10/1991 | Khalid et al. .......... 415/115 |
| 5,209,633 A | * | 5/1993 | McGreehan et al. .......... 415/144 |
| 5,230,605 A | * | 7/1993 | Yamaguchi et al. .......... 415/151 |
| 6,550,254 B2 | * | 4/2003 | Proctor et al. .......... 60/785 |
| 7,594,793 B2 | * | 9/2009 | Guemmer .......... 415/144 |
| 2004/0191058 A1 | * | 9/2004 | Baumann et al. .......... 415/144 |
| 2008/0115504 A1 | * | 5/2008 | Martensson et al. .......... 60/785 |
| 2008/0141677 A1 | * | 6/2008 | Brillert .......... 60/785 |

FOREIGN PATENT DOCUMENTS

| | | |
|---|---|---|
| EP | 0638725 | 2/1995 |
| EP | 1329615 | 7/2003 |
| EP | 1801403 | 6/2007 |

OTHER PUBLICATIONS

European Search Report dated Aug. 10, 2009 from counterpart European patent application.

* cited by examiner

*Primary Examiner* — Ehud Gartenberg
*Assistant Examiner* — Michael B Mantyla
(74) *Attorney, Agent, or Firm* — Timothy J. Klima; Shuttleworth & Ingersoll, PLC (57) ABSTRACT

A gas-turbine compressor has a casing (1) in which a rotor hub (2) is rotatably borne, and a compressor duct (9) being disposed between the casing (1) and the rotor hub (2), in which at least one rotor (4), which is rotatable about a machine axis (5), and one stator (5) are arranged. Recesses (12) of a bleed-air tapping device (6) are provided in the casing (1), which—in at least one circumferential area (11)—are arranged circumferentially to each other recess (12) and include a circumferential leading edge (16) in the circumferential direction and a circumferential trailing edge (17), each of which includes an identical angle $\beta_E$ with the surface (18) of the casing (1).

16 Claims, 7 Drawing Sheets

GAS-TURBINE COMPRESSOR WITH BLEED-AIR TAPPING

This application claims priority to German Patent Application DE102008014957.8 filed Mar. 19, 2008, the entirety of which is incorporated by reference herein.

This invention relates to a gas-turbine compressor.

More particularly, the present invention relates to a gas-turbine compressor from which bleed air is tapped in a casing area.

With turbomachines, bleed air is tapped from compressors (turbo-compressors) at various positions on the compressor casing (FIG. 1) for the purpose of the supply of sub-systems or external consumers, such as the aircraft cabin, for the purpose of stabilizing the compressor during transient maneuvers, for the purpose of turbine cooling or for the purpose of flow recirculation within the compressor. This tapping of bleed air is accomplished either between two blade rows or within a blade row (FIG. 2) or by a combination of both. The bleed-air tapping geometry can basically have any possible shape.

The bleed-air tapping geometry is either a circumferential slot 7 or a discrete hole 8 or a combination of both on the compressor casing. The bleed-air tapping geometry has a very simple shape and is therefore not optimally adapted to the flow conditions existing at the tapping point near the compressor casing. As a result of which, the flow cannot optimally enter the bleed-air tapping geometry. This leads, for example, to flow separation at the entry of the flow into the bleed-air tapping geometry and to high pressure loss within the bleed-air tapping geometry. A further problem is the undesired interaction between the flow in the compressor and the flow in the bleed-air tapping geometry. This leads, for example, to the return of flow from the bleed-air tapping geometry into the main flow. This results in a loss of compressor efficiency, a loss of compressor stability and, under certain circumstances, to mechanical excitation of the compressor blading and even to blade failure.

A broad aspect of the present invention is to provide a gas-turbine compressor of the type specified at the beginning above, which, while being simply designed and easily producible, features high efficiency.

In accordance with the present invention, solution to the above problems is provided by a bleed-air tapping geometry which is adapted to the flow conditions existing at the tapping point in the compressor. The solution according to the present invention especially relates to an adapted bleed-air tapping geometry for the tapping of air between two blade rows (rotor 3/stator 4 or stator 4/rotor 3, respectively, but also stator 4/stator 4 or rotor 3/rotor 3) and before or behind a blade row (rotor 3 or stator 4). The present invention is applicable to an axial-flow or a radial-flow compressor in a turbomachine or a fluid-flow machine.

The bleed-air tapping geometry in accordance with the present invention is characterized by min. pressure loss and max. efficiency.

The present invention describes an optimized bleed-air tapping geometry which can be described by a few geometrical and machine-specific parameters.

The idea underlying the present invention is to provide the bleed-air tapping geometry such that the flow can enter the bleed-air tapping geometry without disturbance, thereby minimizing the local total pressure loss, and is deflected such within the bleed-air tapping geometry that the swirl in the flow is reduced to zero, thereby obtaining a maximum of static pressure recovery.

This can be achieved, on the one hand, by inclining the bleed-air tapping geometry circumferentially at a defined angle to the compressor casing and, on the other hand, by providing the bleed-air tapping geometry axially with a profile which is adapted to the direction of flow entering the bleed-air tapping geometry. This flow direction is determined by the outflow angle of the stator vane where such stator vane is situated upstream of the tapping point or by the outflow angle and the speed of the rotor blade where such rotor blade is situated upstream of the tapping point. If no blade is situated upstream of the bleed-air tapping geometry, the controlling quantity is the flow direction parallel to the machine axis, i.e. 0 degrees.

In the following the present invention is described in detail:

1.) The bleed-air tapping point is situated on the compressor casing between two blade rows or before or behind a blade row. The bleed-air tapping point can have any extension in both axial and circumferential direction.

Figure 3:
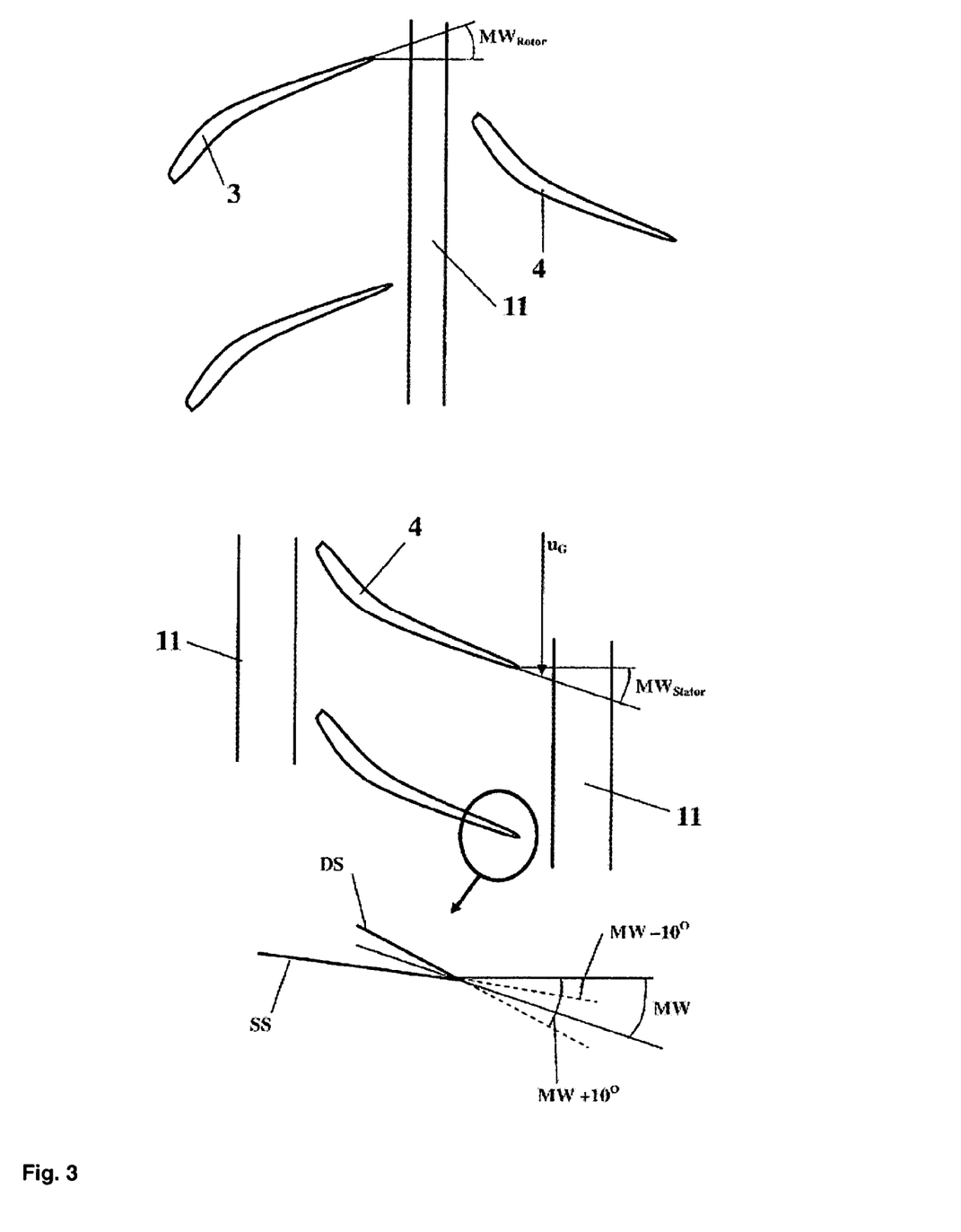
FIG. 3 shows schematic representations for various angle definitions in an analogical view of FIG. 2.
Figure 4:
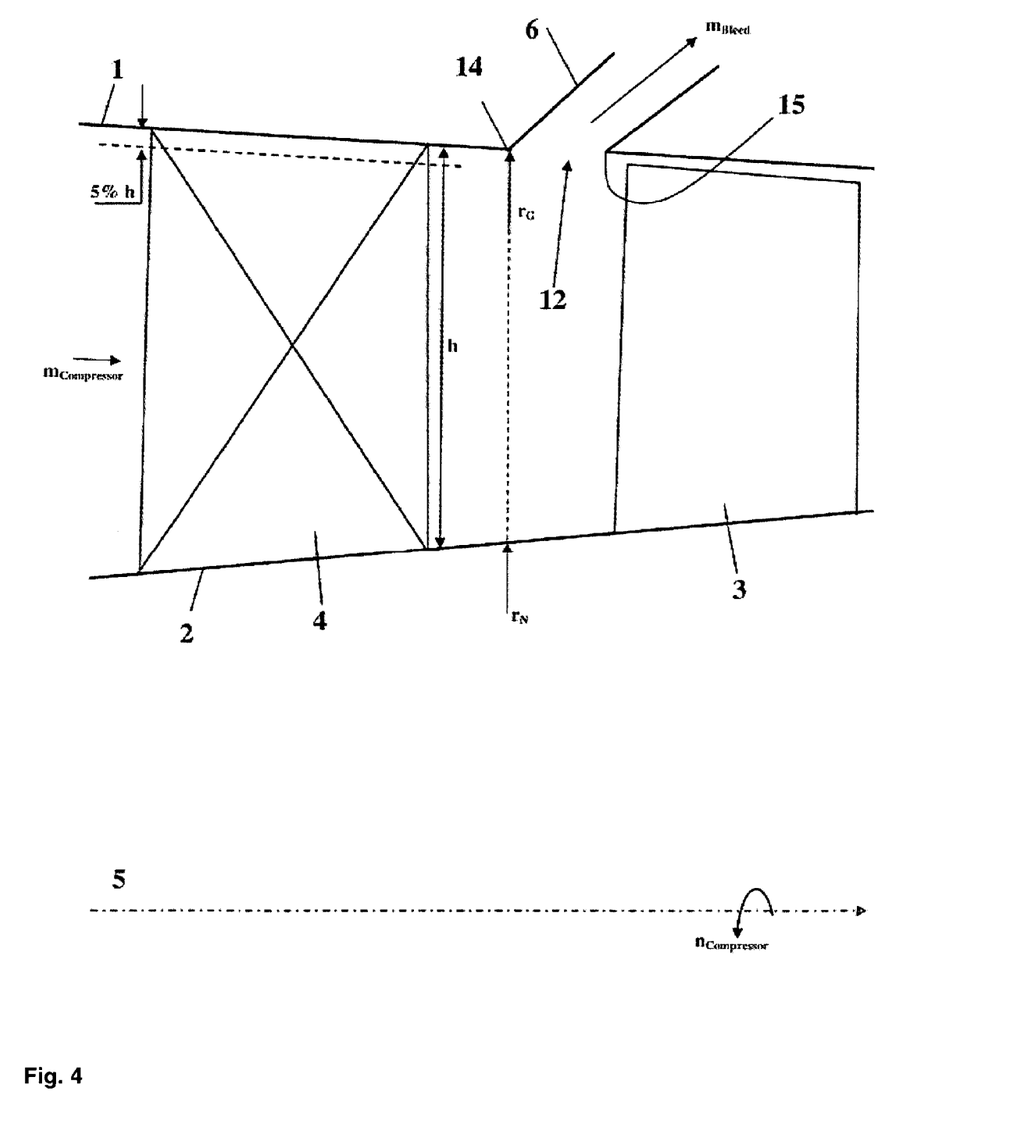
FIG. 4 shows an axial view, also in schematic representation, analogically to FIG. 1.

2.) Where a blade row (rotor or stator) exists upstream of the bleed-air tapping point, it is characterized by a profile exit angle (metal angle) near the compressor casing wall (FIG. 3). The profile exit angle is a measurable quantity resulting from the average of the suction-side (SS) and pressure-side (DS) profile angle (FIG. 3). "Near the casing wall" means at a distance of less than 5% of the blade height (FIG. 4).

3.) This metal exit angle MW is a parameter for the definition of the bleed-air tapping geometry.

4.) A further parameter is the circumferential speed on the compressor casing, $u_G$, which is calculated from the speed of the compressor, $n_{COMPRESSOR}$, [1/s] and the casing radius $r_G$ at the leading edge of the bleed-air tapping geometry as follows:

$$u_G = r_G 2\pi n_{COMPRESSOR}$$

and the hub ratio $$v = r_N/r_G$$

at the leading edge of the bleed-air tapping geometry (FIGS. 3 and 4). Here, $n_{COMPRESSOR}$ is any real number.

5.) A further parameter is the air quantity to be tapped, $\xi$, defined as the bleed air quantity $m_{BLEED}$ relative to the air quantity entering the compressor, $m_{COMPRESSOR}$:

$$\xi = m_{BLEED}/m_{COMPRESSOR}.$$

6.) Furthermore, the numbers of blades in the blade row before resp. behind the bleed-air tapping geometry are to be considered.

7.) These known parameters allow the bleed-air tapping geometry to be defined.

Figure 5:
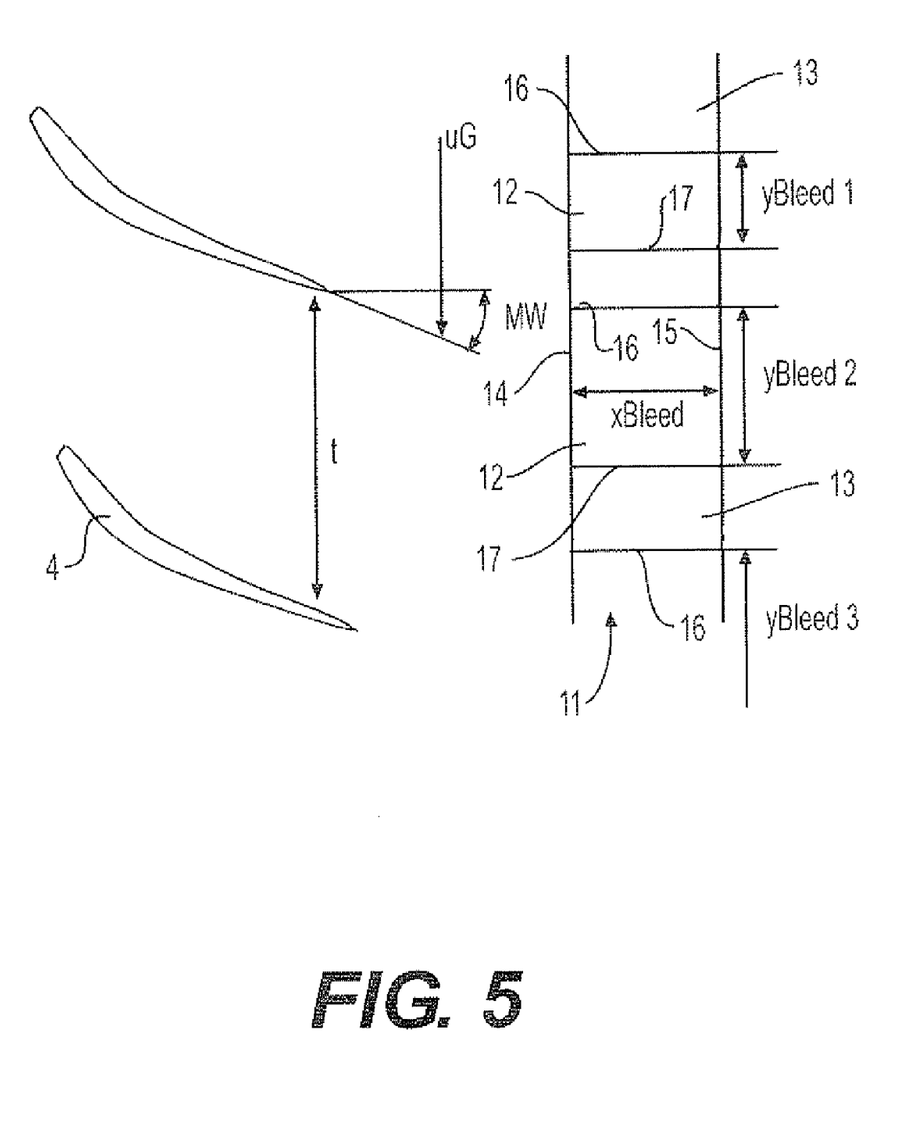
FIG. 5 is a representation of the inventive embodiment with the direction of view being analogical to FIG. 2.

8.) The bleed-air tapping geometry is composed of several discrete bleed-air tapping ducts which are characterized by a defined circumferential and axial extension and shape and have an area as shown in FIG. 5.

9.) Any number of the bleed-air tapping ducts, $N_{BLEED}$, is allowed, but ideally is an integer multiple or an integer divisor of the number of blades of the blade row before resp. behind the tapping point.

10.) Any circumferential extension (dimension), $y_{BLEED}$, of a bleed-air tapping duct (FIG. 5) is allowed, but should be an integer divisor or an integer multiple of the casing pitch t of the downstream or upstream blade row.

11.) Likewise, any axial extension (dimension), $x_{BLEED}$, (FIG. 5) is allowed, but can occupy not more than the axial space available between two blade rows.

12.) The extension in circumferential and axial direction in combination with the number of bleed ducts must however satisfy the condition that the total area $A_{BLEED}$ is sufficient for tapping the desired bleed air quantity $m_{BLEED}$ relative to the compressor entry air quantity $m_{COMPRESSOR}$. The quantities $A_{BLEED}$ and $\xi=m_{BLEED}/m_{COMPRESSOR}$ are input parameters for dimensioning the bleed-air tapping geometry, i.e. the equation:

$$x_{BLEED} y_{BLEED} N_{BLEED} = A_{BLEED}$$

must be met.

Figure 6:
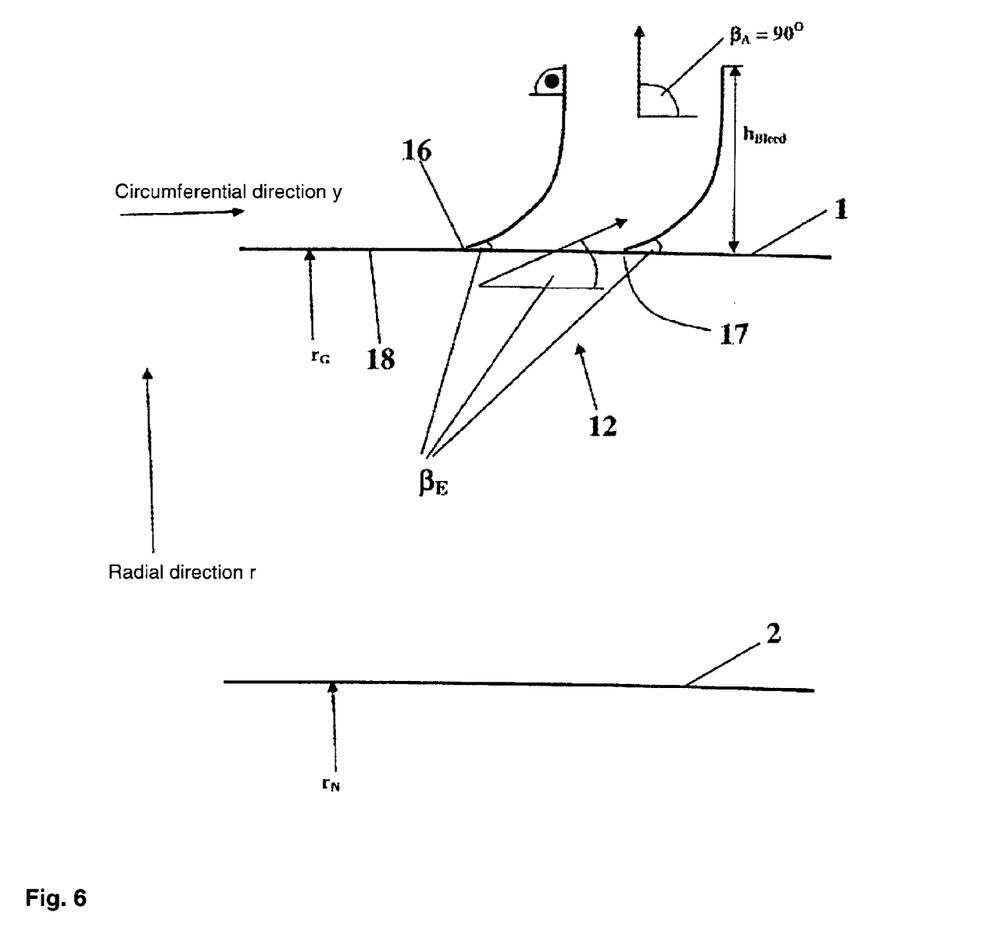
FIG. 6 shows a front view (onto a radial plane of an embodiment in accordance with the present invention)

13.) The shape of the bleed-air tapping geometry in circumferential direction in the y-r plane is defined as follows: The shape in circumferential direction depends on the entry angle of the flow into the bleed-air tapping geometry, $\beta_E$, and on the exit angle from the bleed-air tapping geometry, $\beta_A$ (FIG. 6). The exit angle relative to the machine axis is radial resp. 90 degrees to the compressor casing (swirl-free). The entry angle can be determined by the following quantities:

$\xi$, $r_G$, $\nu$, $A_{BLEED}$, BOA.

The only quantity still to be defined is BOA, the other quantities were already defined in the above. BOA can be defined as follows:

a) If a stator vane exists upstream of the bleed-air tapping geometry, BOA corresponds to the metal exit angle of the stator vane, $MW_{STATOR}$, near the casing ±10 degrees (FIG. 3). "Near the casing" means in an area between 95 and 100 percent of the blade height. Accordingly, BOA can assume values between 10 and 35 degrees for a value of the metal exit angle near the casing of 20 to 25 degrees, for example.

b) If a rotor blade exists upstream of the bleed-air tapping geometry, BOA is calculated from the metal exit angle of the rotor blade, $MW_{ROTOR}$, near the casing ±10 degrees as per the following equation:

$$BOA = \arctan(2 - \tan MW_{ROTOR}).$$

"Near the casing" means in an area between 95 and 100 percent of the blade height. Accordingly, BOA can assume values between 46.9 and 68.6 degrees for a value of the metal exit angle near the casing of 20 and 25 degrees, for example.

c) If no blade row exists downstream of the tapping point, BOA is 0 degrees.

The entry angle of the flow into the bleed-air tapping geometry $\beta_E$ is calculated as follows, using the known quantities:

$$\beta_E = \arctan\left(\frac{\xi \pi r_G^2 (1-\nu^2)^{10}}{A_{BLEED} \tan BOA}\right)$$

This defines the entry angle $\beta_E$ and the exit angle $\beta_A$ (FIG. 6). Connection between these two angles is made by a continuous, non-inflecting line which has the tangent inclination $\beta_E$ at its starting point and the tangent inclination $\beta_A$ at its end point.

14.) The axial shape in the x-y plane (FIG. 7) is defined by the already defined angle BOA at the leading edge of the bleed-air tapping geometry ±10 degrees and an angle at the trailing edge WHK of the bleed-air tapping geometry, which can assume any value between +10 degrees and −10 degrees, but ideally is 0 degrees. Connection between these two angles is made by a continuous, non-inflecting line which has the tangent inclination BOA at its starting point and the tangent inclination WHK at its end point. This definition applies to any axially-parallel section through the bleed-air tapping geometry in the x-y plane at any radial position in the bleed-air tapping geometry (FIG. 8).

15.) The bleed-air tapping geometry can have any inclination relative to the machine axis x (FIG. 8).

Figure 9:
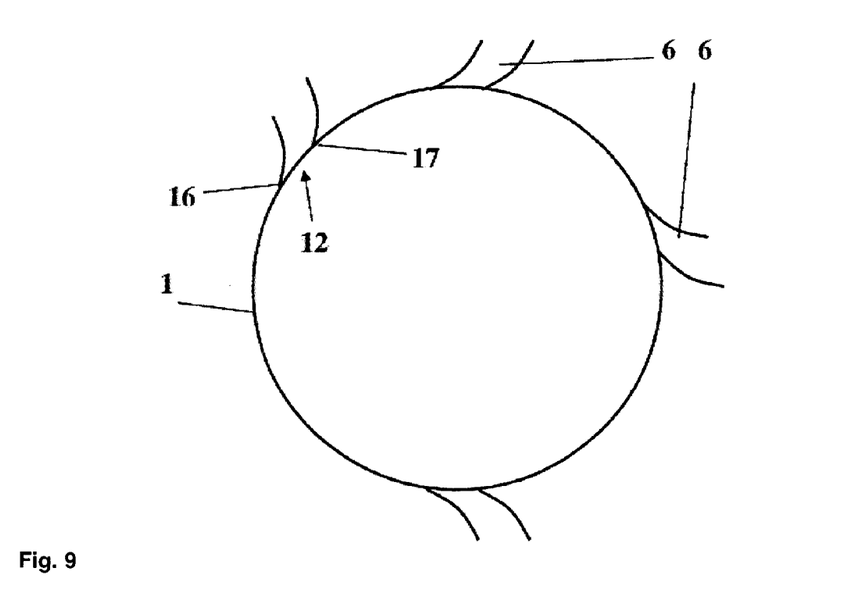
FIG. 9 shows a sectional view of radial planes in simplified representation.

16.) The bleed-air tapping ducts can be freely distributed and arranged over the circumference (y), as shown in FIG. 9.

The present invention is more fully described in light of the accompanying drawings showing preferred embodiments. In the drawings, FIG. 1 (Prior Art) shows a schematic axial view of a compressor with bleed-air tapping in accordance with the state of the art, FIG. 2 (Prior Art) is a schematic representation of the state of the art with bleed-air tapping positions, as viewed radially outward to the casing inner wall.

Figure 1:
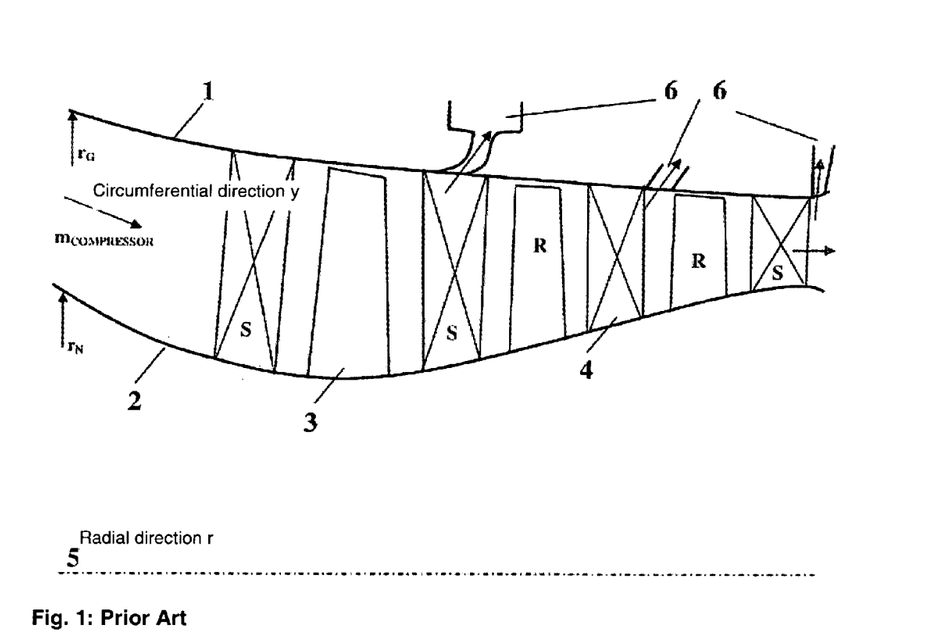
Figure 2:
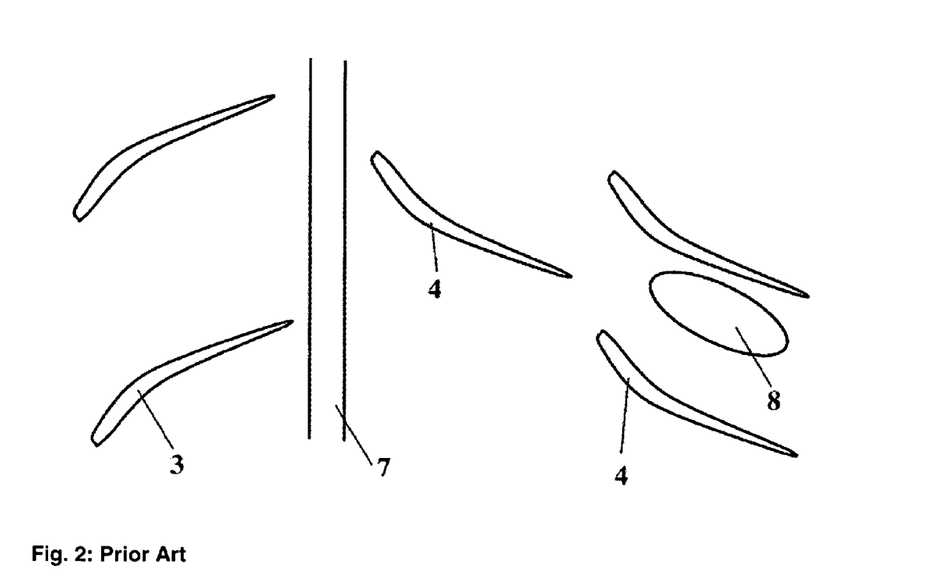

FIG. 1 schematically shows an axially-sectional view of a casing 1 and a rotatably borne hub 2 on which rotor blades 3 are arranged. The casing carries stator vanes 4 in the known manner. The machine axis is indicated by the reference numeral 5. Further, FIG. 1 schematically shows bleed-air tapping devices 6 or bleed-air tapping geometries. These are again shown in schematic representation in FIG. 2, actually as circumferential slot 7 or as discrete hole or recess 8.

FIG. 3 shows first representations explaining the present invention. The upper portion of FIG. 3 shows the definition of the rotor metal angle $MW_{ROTOR}$, which is defined relative to a straight line located parallel to the machine axis 5. The bottom portion of FIG. 3 shows (also in enlarged representation) a stator vane with pressure side DS and suction side SS as well as the definition of the angles and angular ranges.

FIG. 4 schematically shows, in axial view, an axial leading edge 14 and an axial trailing edge 15 of a bleed-air tapping device/bleed-air tapping geometry 6. Also shown is further dimensioning information, in particular for $r_G$ and $r_N$.

FIG. 5 is a casing view in the radial direction to the outside showing the recesses 12 disposed in a strip-like circumferential area 11. These feature the—already mentioned—circumferential leading edges 16 and circumferential trailing edges 17 as well as axial leading edges 14 and axial trailing edges 15. Further shown is the dimensioning in x and y directions from which the areas of the recesses 12 are calculated.

FIG. 6 shows a frontal view representing, highly enlarged, the curvilinear contours of the hub 2 as well as of a casing surface 18 of the casing 1. It yields, in particular, the definition of the entry angle $\beta_E$ as well as of the exit angle $\beta_A$.

Figure 7:
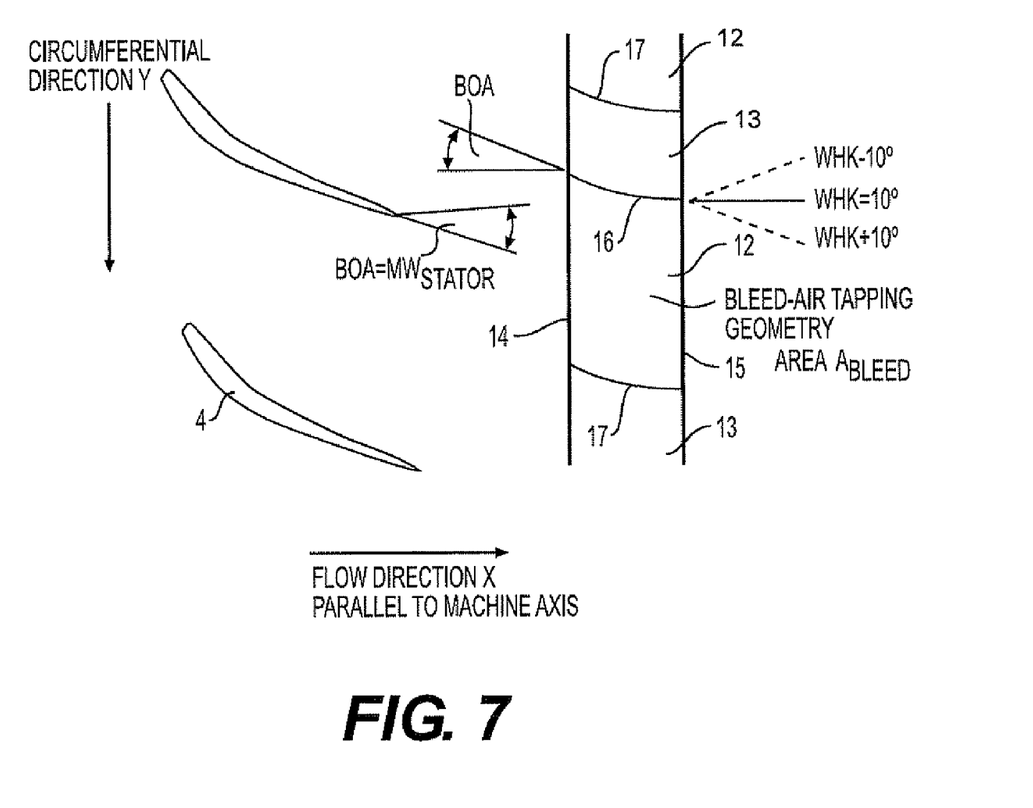
FIG. 7 is a representation of further embodiments, analogically to FIG. 5.
Figure 8:
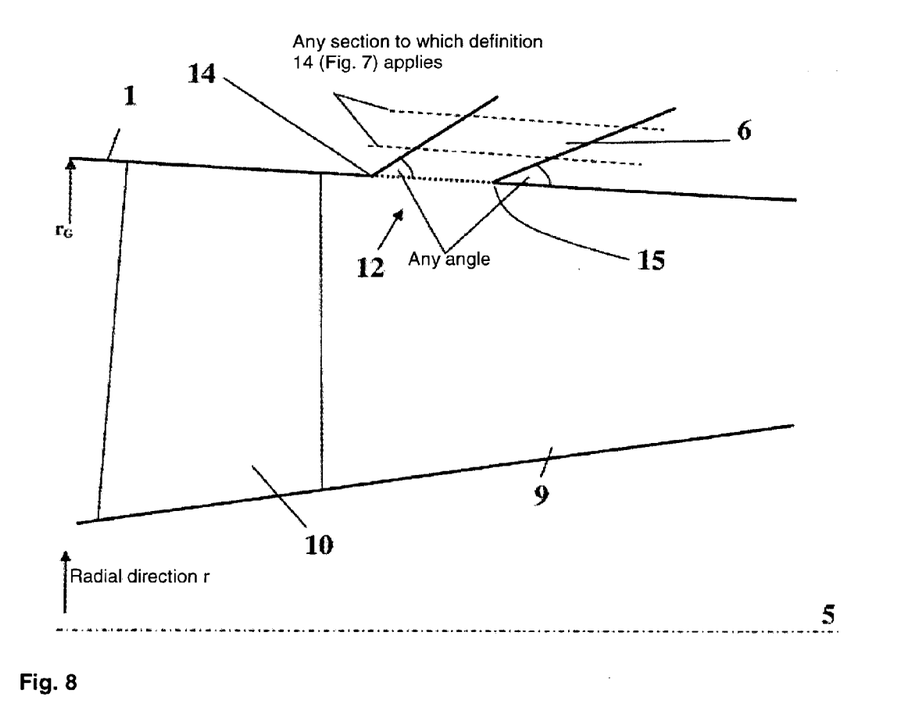
FIG. 8 shows an axially-sectional view in an embodiment according to the present invention.

FIG. 7 shows a representation analogically to FIG. 5 with further angle definitions.

FIG. 8 shows an axial side view from which can be seen, in particular, that in the axial direction the angles at the axial leading edge 14 and at the axial trailing edge 15 can assume any value.

FIG. 9 shows possible distribution arrangements of bleed-air tapping devices 6. These can be evenly or unevenly arranged on the circumference.

The solution according to the present invention advantageously provides for the pressure losses in the bleed-air tapping geometries being minimized and the adverse interaction with the compressor main flow being avoided. This has the effect that the bleed air is tapped more efficiently than with non-optimized geometries. It enables turbine cooling, compressor stabilization and cabin pressurization, for example, to be more efficiently implemented. The compressor and bleed air flow thus improved give rise to enhanced compressor efficiency and stability and, ultimately, to reduced fuel consumption of the engine. Since it is easily producible and does not incur additional investment in manufacturing technology, the improved geometry has no effect on costs. Replacing existing geometries, the improved geometry will not lead to an increased weight for the compressor module.

LIST OF REFERENCE NUMERALS

1 Casing/compressor casing
2 Hub/rotor hub
3 Rotor/rotor blade/rotor blade row (R)
4 Stator/stator vane/stator vane row (S)
5 Machine axis
6 Bleed-air tapping device/bleed-air tapping geometry
7 Circumferential slot
8 Discrete hole/recess
9 Compressor duct
10 Blade
11 Circumferential area
12 Recess
13 Wall area
14 Axial leading edge
15 Axial trailing edge
16 Circumferential leading edge
17 Circumferential trailing edge
18 Casing surface

What is claimed is:
1. A gas turbine axial flow compressor, comprising:
a casing;
a rotor hub rotatably borne in the casing;
an axial flow compressor duct disposed between the casing and the rotor hub;
at least one rotor, which is rotatable about a machine axis;
at least one stator, the at least one rotor and at least one stator being positioned axially spaced from one another within the axial flow compressor duct;
a bleed air tapping device having a plurality of recesses axially positioned in the casing both: outside of a bladed space of the at least one stator, and at least one of: before or behind a blade row of the at least one rotor or between two blade rows of two rotors; which recesses, in at least one circumferential area, are arranged circumferentially to each other, wherein each recess includes, in a circumferential direction, a circumferential leading edge and a circumferential trailing edge, each of which is situated at an identical angle ($\beta_E$) with a surface of the casing, this angle being calculated as per the following formula:

$$\beta_E = \arctan\left(\frac{\xi \pi r_G^2 (1-v^2)}{A_{BLEED} \tan BOA}\right),$$

where
($\xi$) is a dimensionless air quantity to be tapped, which derives from an extraction air flow $m_{BLEED}$ and a compressor air flow $m_{COMPRESSOR}$ and is calculated as follows:

$$(\xi) = m_{BLEED}/m_{COMPRESSOR}.$$

($r_G$) is a casing radius at the circumferential leading edge,
($r_N$) is a hub radius,
(v) is a hub ratio at the circumferential leading edge, with
$(v) = r_N r_G$,
($A_{BLEED}$) is a total surface of all recesses of the circumferential area, and
(BOA) is an identical angle of the circumferential leading edge and the circumferential trailing edge, relative to a straight line located parallel to the machine axis, with the angle (BOA) satisfying one of the following rules:
a) if a stator vane exists upstream of the recess, the angle (BOA) ranges within ±10 degrees of a metal exit angle ($MW_{STATOR}$) of the stator vane in a range of 95 percent to 100 percent of the blade height of the stator,
b) if a rotor blade exists upstream of the recess, the angle (BOA) is calculated from the metal exit angle ($MW_{ROTOR}$) of the rotor blade ±10 degrees in a range of 95 percent to 100 percent of the blade height of the rotor as per the following equation:

$$BOA = \arctan(2 - \tan MW_{ROTOR})$$

c) if no blade row exists upstream of the recess, the angle BOA is 0 degrees.
2. The gas turbine compressor of claim 1, wherein the total area ($A_{BLEED}$) is calculated as per the equation:

$$x_{BLEED} y_{BLEED} N_{BLEED} = A_{BLEED},$$

with
$N_{BLEED}$ being a number of the recesses,
$X_{BLEED}$ being a dimension of the recesses in an axial direction, and
$Y_{BLEED}$ being a dimension of the recesses in the circumferential direction.
3. The gas turbine compressor of claim 2, wherein an angle WHK of a downstream end area of the circumferential leading edge and of the circumferential trailing edge is defined relative to a straight line located parallel to the machine axis in a range of ±10 degrees to this straight line.
4. The gas turbine compressor of claim 3, wherein the angle WHK is 0 degrees.
5. The gas turbine compressor of claim 4, wherein the circumferential leading edge and the circumferential trailing edge are each provided as a continuous, non-inflecting line.
6. The gas turbine compressor of claim 1, wherein an angle WHK of a downstream end area of the circumferential leading edge and of the circumferential trailing edge is defined relative to a straight line located parallel to the machine axis in a range of ±10 degrees to this straight line.
7. The gas turbine compressor of claim 6, wherein the angle WHK is 0 degrees.
8. The gas turbine compressor of claim 7, wherein the circumferential leading edge and the circumferential trailing edge are each provided as a continuous, non-inflecting line.
9. The gas turbine compressor of claim 6, wherein the circumferential leading edge and the circumferential trailing edge are each provided as a continuous, non-inflecting line.
10. The gas turbine compressor of claim 1, wherein the circumferential leading edge and the circumferential trailing edge are each provided as a continuous, non-inflecting line.
11. The gas turbine compressor of claim 8, wherein the compressor includes:
a) a stator vane upstream of the recess, and the angle (BOA) ranges within ±10 degrees of a metal exit angle ($MW_{STATOR}$) of the stator vane in a range of 95 percent to 100 percent of the blade height of the stator.
12. The gas turbine compressor of claim 8, wherein the compressor includes:
b) a rotor blade upstream of the recess, and the angle (BOA) is calculated from the metal exit angle ($MW_{ROTOR}$) of the rotor blade ±10 degrees in a range of 95 percent to 100 percent of the blade height of the rotor as per the following equation:

$$BOA = \arctan(2 - \tan MW_{ROTOR}).$$

13. The gas turbine compressor of claim 8, wherein the compressor includes:
   c) no blade row upstream of the recess, and the angle BOA is 0 degrees.

14. The gas turbine compressor of claim 1, wherein the compressor includes:
   a) a stator vane upstream of the recess, and the angle (BOA) ranges within ±10 degrees of a metal exit angle ($MW_{STATOR}$) of the stator vane in a range of 95 percent to 100 percent of the blade height of the stator.

15. The gas turbine compressor of claim 1, wherein the compressor includes:
   b) a rotor blade upstream of the recess, and the angle (BOA) is calculated from the metal exit angle ($MW_{ROTOR}$) of the rotor blade ±10 degrees in a range of 95 percent to 100 percent of the blade height of the rotor as per the following equation:

$$BOA = \arctan(2 - \tan MW_{ROTOR}).$$

16. The gas turbine compressor of claim 1, wherein the compressor includes:
   c) no blade row upstream of the recess, and the angle BOA is 0 degrees.

* * * * *